United States Patent
Oki (10) Patent No.: US 10,157,329 B2
(45) Date of Patent: Dec. 18, 2018

(54) MOVING BODY DETECTING DEVICE AND IMAGE PROCESSING SYSTEM

(71) Applicant: KABUSHIKI KAISHA TOSHIBA, Minato-ku, Tokyo (JP)

(72) Inventor: Yutaka Oki, Ome Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 432 days.

(21) Appl. No.: 14/847,525

(22) Filed: Sep. 8, 2015

(65) Prior Publication Data

US 2016/0267350 A1    Sep. 15, 2016

(30) Foreign Application Priority Data

Mar. 11, 2015  (JP) .................. 2015-048647

(51) Int. Cl.
*G06K 9/00*  (2006.01)
*G06K 9/62*  (2006.01)
(Continued)

(52) U.S. Cl.
CPC ......... *G06K 9/6201* (2013.01); *H04N 5/2353* (2013.01); *H04N 5/23254* (2013.01)

(58) Field of Classification Search
CPC . G06K 9/6201; H04N 5/23254; H04N 5/2353
See application file for complete search history.

(56) References Cited

U.S. PATENT DOCUMENTS 7,557,832 B2 * 7/2009 Lindenstruth ...... H04N 5/23248
348/208.14
7,773,115 B2 * 8/2010 Estevez .............. H04N 5/23248
348/208.13
(Continued)

FOREIGN PATENT DOCUMENTS

| JP | 2009-260462 | 11/2009 |
| JP | 2009-301494 | 12/2009 |
| JP | 2011-013838 | 1/2011 |

OTHER PUBLICATIONS

Abhijit Kundu, K Madhava Krishna and Jayanthi Sivaswamy, "Moving Object Detection by Multi-View Geometric Techniques from a Single Camera Mounted Robot", Centre for Robotics, International Institute of Information Technology, Hyderabad—500 032, India, Oct. 2009, 8 pgs.

(Continued)

*Primary Examiner* — Jonathan S Lee
(74) *Attorney, Agent, or Firm* — Knobbe, Martens, Olson & Bear, LLP (57) ABSTRACT

A moving body detecting device in accordance with embodiments includes a motion information acquirer, approximate image generator, and moving body detector. The motion information acquirer generates motion information on an imaging device capable of performing imaging with a first exposure time and a second exposure time longer than the first exposure time. The approximate image generator generates an approximate image generated by approximating one of a first photographic image imaged with the first exposure time and a second photographic image imaged with the second exposure time to another photographic image, on the basis of the motion information. The moving body detecting device detects a moving body captured in the first and second photographic images, on the basis of the approximate image and the other photographic image.

16 Claims, 9 Drawing Sheets

(51) Int. Cl.
H04N 5/235 (2006.01)
H04N 5/232 (2006.01)

(56) References Cited

U.S. PATENT DOCUMENTS

| | | | | |
|---|---|---|---|---|
| 7,970,171 | B2* | 6/2011 | Lookingbill | G06K 9/228 |
| | | | | 382/103 |
| 9,172,876 | B2* | 10/2015 | Kusaka | H04N 5/23251 |
| 2005/0047672 | A1* | 3/2005 | Ben-Ezra | H04N 5/2258 |
| | | | | 382/255 |
| 2008/0291286 | A1* | 11/2008 | Fujiyama | H04N 5/23248 |
| | | | | 348/222.1 |
| 2011/0122266 | A1* | 5/2011 | Jang | H04N 5/23248 |
| | | | | 348/208.6 |
| 2013/0121537 | A1* | 5/2013 | Monobe | H04N 5/23254 |
| | | | | 382/106 |
| 2014/0247369 | A1* | 9/2014 | Kusaka | H04N 5/23251 |
| | | | | 348/208.1 |
| 2015/0036878 | A1* | 2/2015 | Nashizawa | G06T 5/50 |
| | | | | 382/103 |

OTHER PUBLICATIONS

Giacomo Boracchi, Alessandro Foi, Vladimir Katkovnik, and Karen Egiazarian, "Deblurring noisy radial-blurred images:spatially adaptive filtering approach" 12 pgs. (Obtained on Sep. 3, 2015).

* cited by examiner

MOVING BODY DETECTING DEVICE AND IMAGE PROCESSING SYSTEM

CROSS REFERENCE TO RELATED APPLICATIONS

This application is based upon and claims the benefit of priority from the prior Japanese Patent Application No. 2015-48647, filed on Mar. 11, 2015, the entire contents of which are incorporated herein by reference.

FIELD

Embodiments of the present invention relate to a moving body detecting device and image processing system.

BACKGROUND

There is a technology for detecting a moving body that appears in an image produced by a camera installed at a fixed position, such as, a fixed-point camera. However, the technology is confronted with a problem that it is hard to detect a moving body from an image produced by a camera mounted on a moving body such as a human being or vehicle.

There is a technology for detecting a moving body by producing feature points, which are matched with each other, from two frames produced by a monocular camera. Unless the matched feature points meet a condition of epipolar geometry or constraint, the feature points are detected as a moving body.

In the technology, as long as a camera whose exposure time is short (that is, frame rate is high) is used, a searching range for feature points that are matched with each other can be narrowed down. However, when the exposure time is short, since information on a moving body is produced from discontinuous photographic images, it is hard to accurately follow the trajectory of the moving body, and precision in detecting the moving body is insufficient.

In contrast, when a camera whose exposure time is long (that is, frame rate is low) is used, since a moving distance of a subject or camera gets longer, a searching range for feature points that are matched with each other is widened. When the searching range is widened, precision in detecting a moving body gets lower than that when a camera whose exposure time is short is used. In addition, occlusion in which the moving body does not appear in a photographic image because the moving body is hidden behind a body existing in front of (on the side of the camera) the moving body is liable to occur. This poses a problem in that precision in detecting the moving body is further degraded.

DETAILED DESCRIPTION

A moving body detecting device in accordance with embodiments includes a motion information acquirer, approximate image generator, and moving body detector. The motion information acquirer acquires motion information on an imaging device capable of performing imaging with a first exposure time and a second exposure time longer than the first exposure time. The approximate image generator generates an approximate image generated by approximating one of a first photographic image imaged with the first exposure time and a second photographic image imaged with the second exposure time to another photographic image, on the basis of the motion information. The moving body detecting device detects a moving body captured in the first and second photographic images, on the basis of the approximate image and the other photographic image.

Referring to drawings, embodiments of the present invention will be described below. In the embodiments below, a description will be made mainly of a characteristic configuration and actions of a moving body detecting device. However, a component or action that will be excluded from the description to be made below may exist in the moving body detecting device. The excluded component and action shall be encompassed in the scope of the present embodiment.

(First Embodiment)

Figure 1:
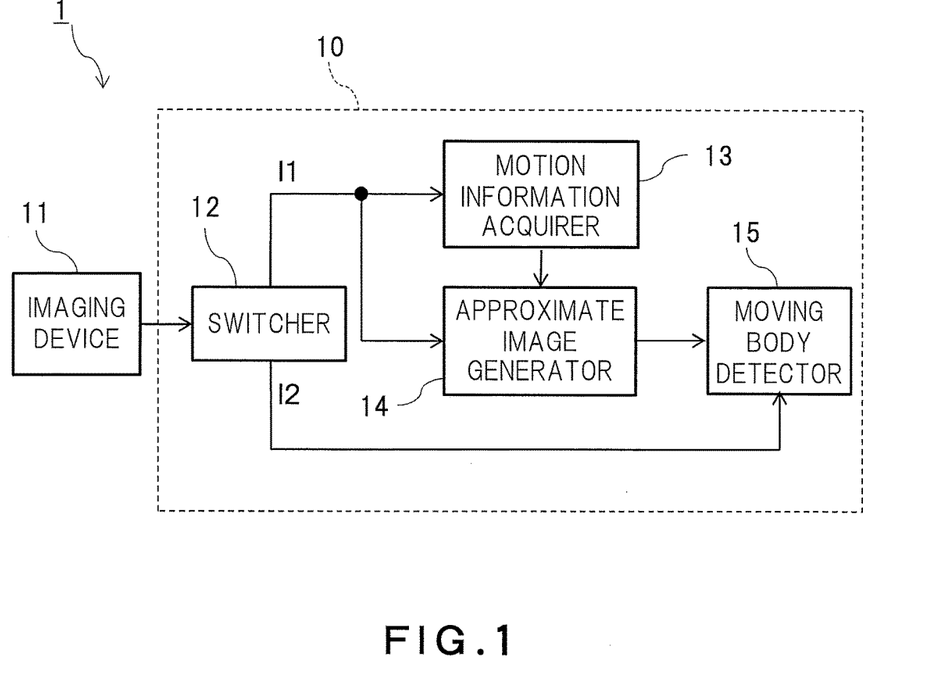
FIG. 1 is a block diagram of an image processing system in accordance with a first embodiment.

FIG. 1 is a block diagram of an image processing system 1 in accordance with a first embodiment. The image processing system 1 can be used to, for example, detect a moving body in an onboard ambience monitoring system or head-mounted display. The moving body is, for example, a vehicle or pedestrian.

The image processing system 1 includes a moving body detecting device 10 and imaging device 11. The moving body detecting device 10 includes a switcher 12, motion information acquirer 13, approximate image generator 14, and moving body detector 15. The imaging device 11 is a camera attached to a predetermined position on a vehicle in a predetermined posture. The imaging device 11 may be a camera that uses a solid-state image sensor such as a CMOS sensor to perform imaging. The imaging device 11 may be a camera capable of performing imaging in an infrared region. The number of imaging devices 11 is not limited to one but plural imaging devices may be included. A photographic image is outputted from the imaging device 11 in the form of a digital signal. The switcher 12 switches output destinations of a photographic image through, for example, automatic switching of a switch.

(Imaging Device 11)

The imaging device 11 can perform imaging with a first exposure time and imaging with a second exposure time longer than the first exposure time. The imaging device 11 may perform imaging with an exposure time other than the first and second exposure times. An imaging direction and imaging range of the imaging device 11 may be arbitrarily adjustable or may be fixed.

The imaging device 11 alternately performs imaging with the first exposure time and imaging with the second exposure time. In case the imaging device 11 includes plural solid-state imaging sensors, the imaging device 11 may concurrently perform the imaging with the first exposure time and the imaging with the second exposure time.

The imaging device 11 outputs a first photographic image (image data) I1 imaged (produced) with the first exposure time, and a second photographic image (image data) I2 imaged with the second exposure time, to the switcher 12.

What is referred to as a blur is a blur contained in an image. More particularly, the blur falls into a blur derived from a movement of the imaging device 11 and a blur derived from a movement of a moving body. The first photographic image I1 is used to generate (identify) blur filters at the time of performing processing of detecting a moving body. The second photographic image I2 is used to detect a difference from a blurry image at the time of performing the processing of detecting a moving body.

(Switcher 12)

The switcher 12 transmits the first photographic image I1 to the motion information acquirer 13 and approximate image generator 14 by performing a switching action, and transmits the second photographic image I2 to the moving body detector 15. The switcher 12 may perform the switching action synchronously with an imaging action of the imaging device 11. In other words, the switcher 12 may perform the switching action in line with the timing when the imaging device 11 performs imaging with the first exposure time or second exposure time. As for the switching action, for example, when the image I2 is transmitted to the switcher 12, information with which an exposure time is specified may be transmitted in association with each photographic image. The switcher 12 receives the information, and in turn switches transmission destinations of the first photographic image I1 or the second photographic image I2.

(Motion Information Acquirer 13)

The motion information acquirer 13 acquires motion information on the imaging device 11 (hereinafter, simply, motion information). The motion information contains a moving quantity and moving direction of the imaging device 11. The moving quantity may be a moving quantity per unit time, that is, a moving speed. The motion information may further contain a posture of the imaging device 11. The motion information may be a translation vector or rotation matrix of the imaging device 11. The motion information may be parameters concerning the imaging device 11.

The motion information acquirer 13 acquires motion information on the basis of plural first photographic images I1 produced at different imaging times (imaging initiation times). The motion information acquirer 13 generates (acquires) blur filters on the basis of the motion information. The blur filters are filters that simulate a blur derived from a movement of the imaging device 11. The motion information acquirer 13 outputs the blur filters to the approximate image generator 14.

The blur filters simulate a blur derived from a movement of the imaging device 11 but do not simulate a blur derived from a movement of a moving body. Using the blur filters that simulate only the blur derived from the movement of the imaging device 11, a blurry image suitable for detection of the moving body can be produced.

(Approximate Image Generator 14)

The approximate image generator 14 generates an approximate image generated by approximating one of the first photographic image and the second photographic image to the other photographic image, on the basis of motion information. In the first embodiment, the approximate image generator 14 generates a blurry image, which has the first photographic image I1 approximated to the second photographic image I2, on the basis of the motion information. Namely, the approximate image generator 14 performs image processing on the first photographic image I1 on the basis of the motion information so as to generate the blurry image. The blurry image is an example of the approximate image.

More particularly, the approximate image generator 14 convolutes (performs image processing) the blur filters, which are produced based on the motion information, into the first photographic image I1 so as to generate the blurry image. The approximate image generator 14 outputs the blurry image to the moving body detector 15.

The blurry image is produced based on the blur filters that can simulate a blur derived from a movement of the imaging device 11. Therefore, the blurry image contains a quasi-blur derived from the movement of the imaging device 11 but does not contain a quasi-blur derived from a movement of a subject. Using the blurry image containing the quasi-blur alone, a moving body can be readily and highly precisely detected.

(Moving Body Detector 15)

The moving body detector 15 detects a moving body captured in the first photographic image I1 and the second photographic image I2, on the basis of the blurry image and the second photographic image I2. More particularly, the moving body detector 15 detects as the moving body the difference between the blurry image and the second photographic image I2.

The blurry image contains only a blur derived from a movement of the imaging device 11. In contrast, the second photographic image I2 contains blurs derived from the movement of the imaging device 11 and a movement of a subject respectively. Therefore, by obtaining the difference between the blurry image and the second photographic image I2, the blur derived from the movement of the imaging device 11 is removed from between the images. In contrast, the blur derived from the movement of the subject is contained in the difference between the blurry image and the second photographic image I2. The difference image shows the subject that has moved, that is, the moving body. Therefore, by obtaining the difference, the moving body appearing in the second photographic image can be readily and highly precisely detected.

If a moving body is detected using only a camera whose exposure time is short, it is hard to accurately follow the trajectory of the moving body because information on the moving body is produced based on discontinuous photographic images. As a result, precision in detecting the moving body is insufficient. In contrast, in the first embodiment, a component of a blur derived from a movement of the imaging device 11 can be removed with a blurry image from the continuous second photographic image I2 that reflects the trajectory of the moving body. As a result, the moving body can be highly precisely detected.

(Moving Body Detecting Actions)

Figure 2:
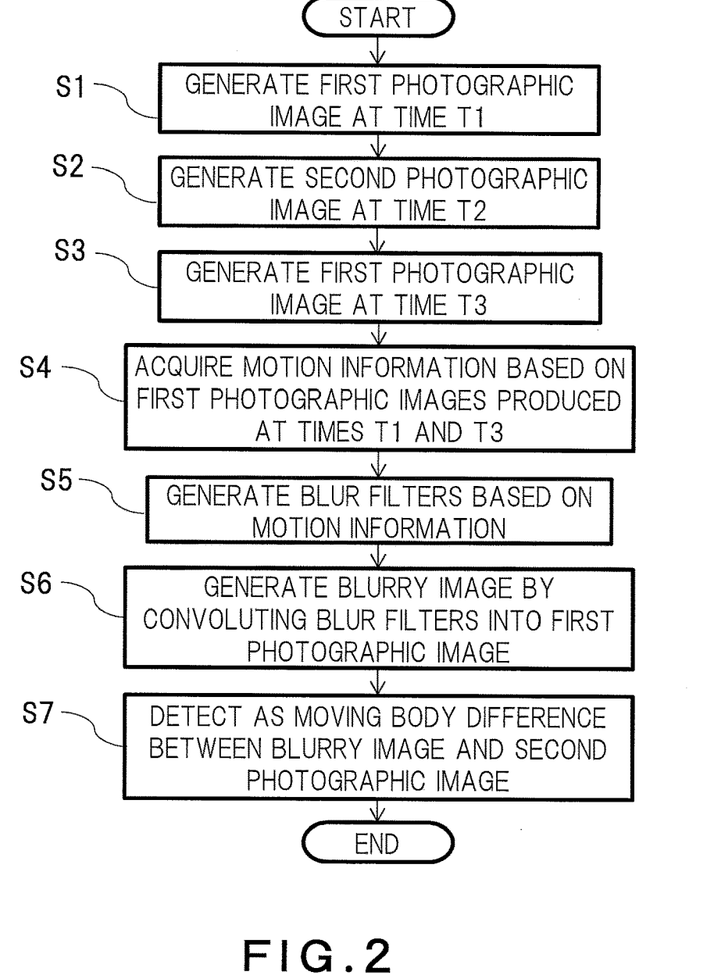
FIG. 2 is a flowchart describing an example of actions of the image processing system shown in FIG. 1.
Figure 3:
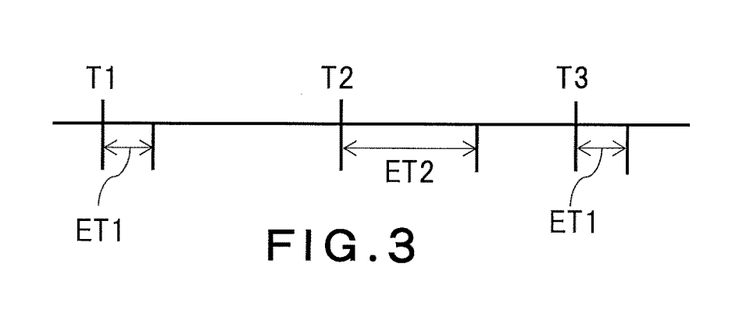
FIG. 3 is an explanatory diagram concerning an exposure time of an imaging device 11.

Referring to the drawings, an example of actions of the moving body detector 15, that is, a moving body detecting method will be described below. FIG. 2 is a flowchart describing an example of actions of the image processing system 1 shown in FIG. 1. FIG. 3 is an explanatory diagram concerning exposure times of the imaging device 11. FIG. 3 shows that imaging is performed with the first exposure time ET1 at times T1 and T3 and with the second exposure time ET2 at a time T2.

Figure 4A:
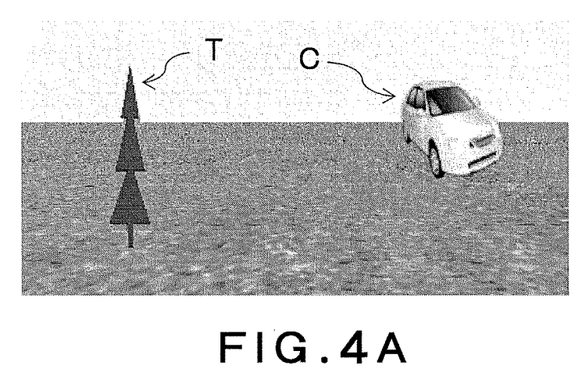
FIG. 4A is a diagram showing a first photographic image at a time T1.

The imaging device 11 generates the first photographic image I1 with the first exposure time ET1 at the time T1 (S1). FIG. 4A is a diagram showing an example of the photographic image produced at the time T1. Shown as the first photographic image I1 produced at the time T1 is an image of a space in front of a vehicle in an advancing direction of the vehicle on which the imaging device 11 is mounted. In the first photographic image I1, an oncoming vehicle C (moving body) and tree T (stationary body) appear.

Thereafter, the imaging device 11 generates the second photographic image I2 with the second exposure time ET2 at the time T2 (S2). The second photographic image I2 contains a blur derived from a movement of the imaging device 11 (vehicle), which occurs during a period from the time T1 to time T2, and a blur derived from a movement of the oncoming vehicle C occurring during the period from the time T1 to time T2.

Figure 4B:
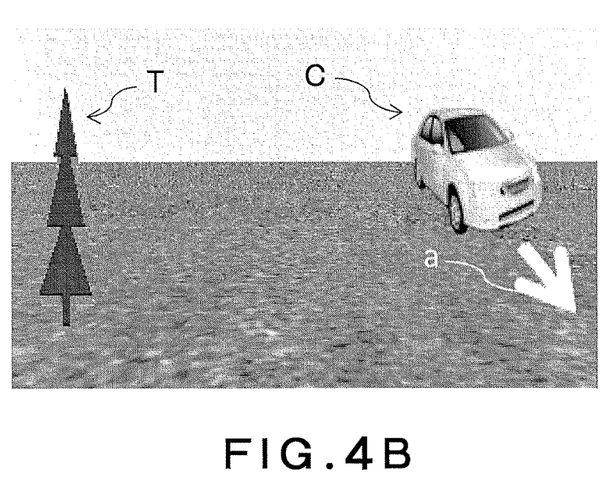
FIG. 4B is a diagram showing the first photographic image at a time T3.

Thereafter, the imaging device 11 generates the first photographic image I1 at the time T3 (S3). FIG. 4B shows an example of the photographic image produced at the time T3. FIG. 4B shows an image in which the vehicle and oncoming vehicle C have farther advanced than they are shown in FIG. 4A. In the first photographic image I1 shown in FIG. 4B, the oncoming vehicle C and tree T located in front of the vehicle appear to be larger than they are shown in FIG. 4A. An arrow a in FIG. 4B indicates an advancing direction of the oncoming vehicle C.

Thereafter, the motion information acquirer 13 acquires motion information on the basis of the first photographic image I1 produced at the time T1 and the first photographic image I1 produced at the time T3 (S4). The motion information acquirer 13 generates blur filters on the basis of the motion information (S5).

Figure 5:
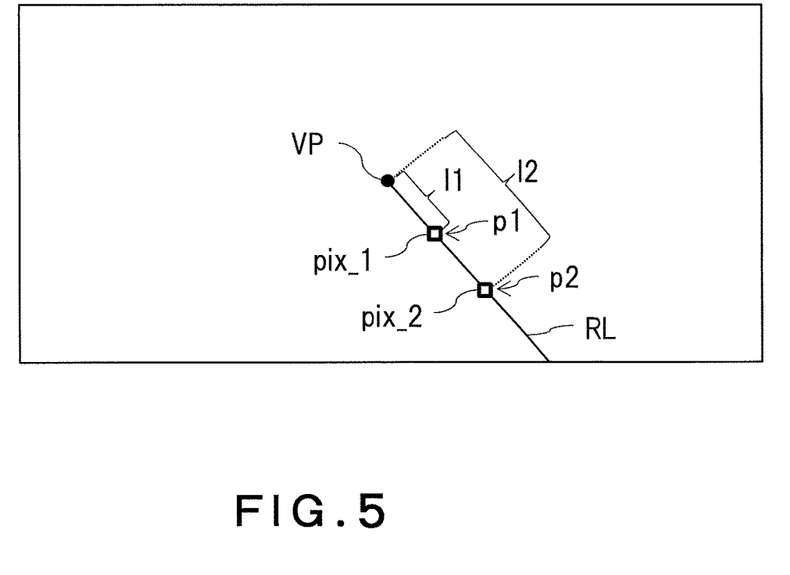
FIG. 5 is an example of an explanatory diagram concerning blur filters.

FIG. 5 is an example of an explanatory diagram concerning blur filters. A blur (radial blur) is oriented along a radial line RL with a vanishing point VP in an image as a center. The radial line RL extends in a moving direction contained in motion information. The blur filters may be referred to as a point image spread function (PSF). The blur filters (kernel) that simulate a blur differ among pixels, and are each determined with a position and distance of a pixel in the direction of the radial line RL with the vanishing point VP as a reference. For example, the blur filter to be included in the first pixel pix_1 is determined with a position p1 and distance l1 in the direction of the radial line RL. Likewise, the blur filter of the second pixel pix_2 is determined with a position p2 and distance l2. Herein, the position of a pixel is affected by motion information. For example, assume that a certain pixel concerned is located at the vanishing point VP at the time T1. If the moving quantity of the imaging device 11 takes on a value corresponding to l1, the pixel concerned at the time T3 is the first pixel px_1. If the moving quantity of the imaging device 11 takes on a value corresponding to l2, the pixel concerned at the time T3 is the second pixel pix_2. Therefore, the blur filters are, for example, determined with the motion information.

Thereafter, the approximate image generator 14 convolutes blur filters into the first photographic image I1 so as to generate a blurry image (S6). The blurry image contains a quasi-blur derived from a movement of the imaging device 11 but does not contain a blur derived from a movement of the oncoming vehicle C.

Figure 4C:
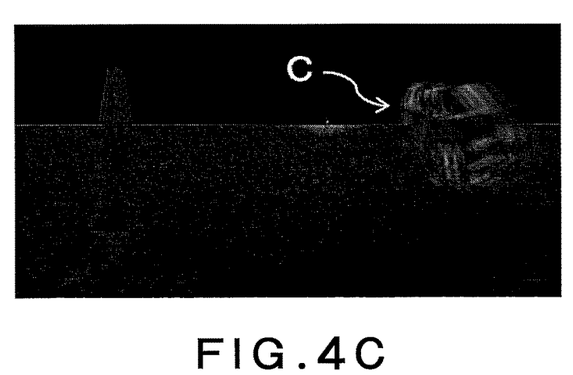
FIG. 4C is a diagram showing a difference between a blurry image and a second photographic image.
Figure 6A:
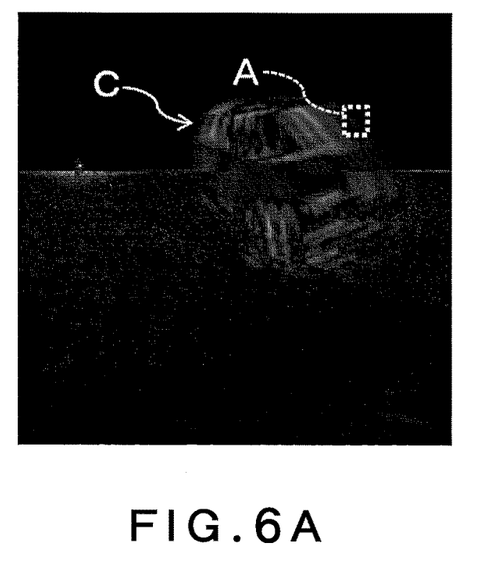
FIG. 6A is a partially enlarged diagram of FIG. 4C.
Figure 6B:
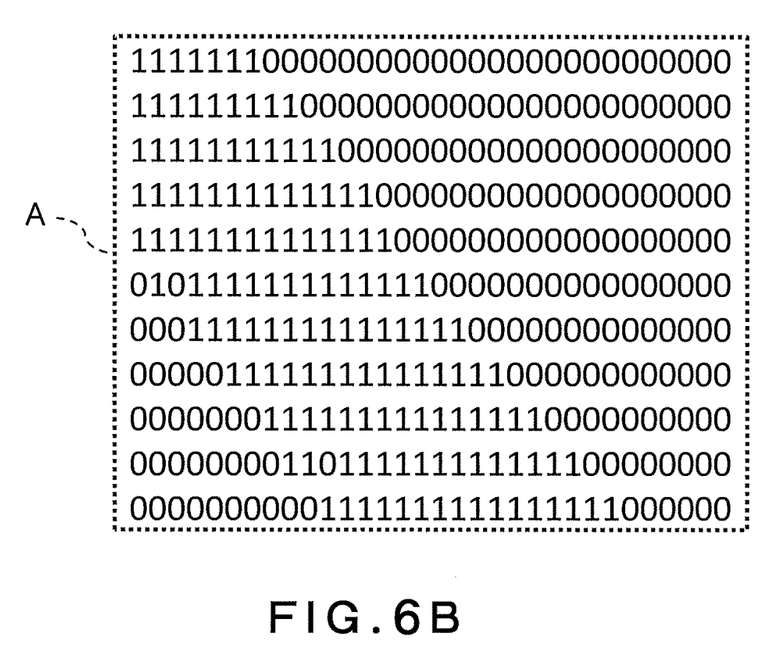
FIG. 6B is a diagram showing an area A in FIG. 6A with numerical values.

Thereafter, the moving body detector 15 detects as a moving body the difference between a blurry mage and the second photographic image I2 (S7). FIG. 4C shows an example of the difference between the blurry image and the second photographic image. The difference contains a blur derived from a movement of the oncoming vehicle C. FIG. 6A is a partly enlarged diagram of FIG. 4C. FIG. 6B is a diagram expressing an area A in FIG. 6A with numerical values. The moving body detector 15 converts the difference between the blurry image and the second photographic image I2 in the area A in FIG. 6A into a binary image like the one shown in FIG. 6B, and detects the difference. The moving body detector 15 can merely detect the difference but may not necessarily be able to convert the difference into the binary image. By obtaining the difference between the blurry image and the second photographic image I2, the blur derived from the movement of the oncoming vehicle C and contained in the second photographic image I2 can be extracted. Thus, the moving body (oncoming vehicle C) can be highly precisely detected using a simple technique.

As mentioned above, in the first embodiment, blur filters are applied to the first photographic image I1 produced with a short exposure time in order to generate a blurry image. The blurry image contains a blur derived from a movement of the imaging device 11 but does not contain a blur derived from a movement of a moving body. By obtaining the difference between the burry image and the second photographic image I2 produced with a long exposure time, the blur derived from the movement of the imaging device 11 can be canceled and the blur derived from the movement of the moving body can be extracted. Accordingly, the moving body appearing in the first photographic image I1 and the second photographic image I2 can be highly precisely detected. Namely, according to the first embodiment, precision in detecting a moving body can be upgraded using a simple technique.

(Second Embodiment)

Figure 7:
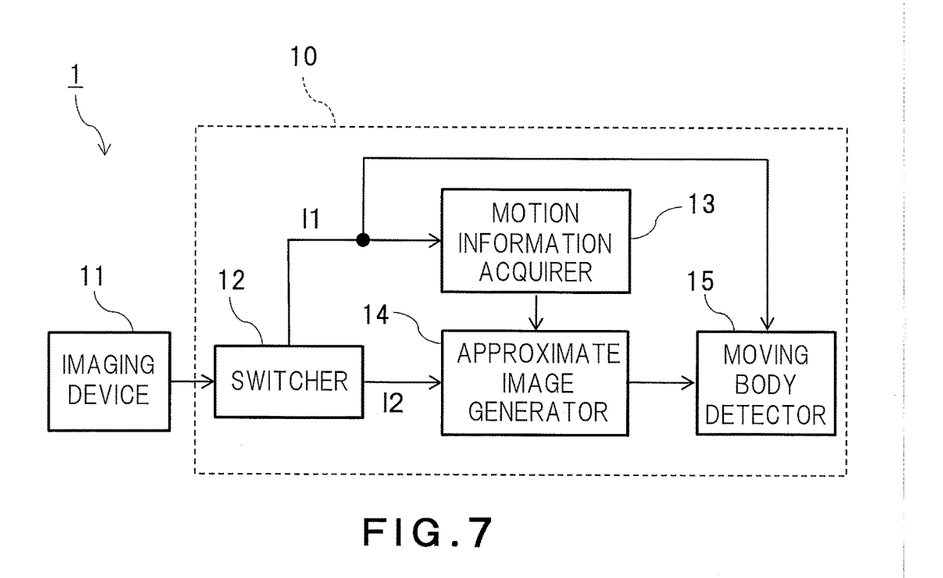
FIG. 7 is a block diagram of an image processing system in accordance with a second embodiment.

An image processing system 1 of a second embodiment is different from that of the first embodiment in a way of applying the photographic images I1 and I2 that are used to detect a moving body. FIG. 7 is a block diagram of the image processing system 1 in accordance with the second embodiment. For a description of the present embodiment, the same reference signs will be assigned to components corresponding to those of the first embodiment. An iterative description will be omitted.

In the second embodiment, the switcher 12 feeds the first photographic image I1 to the moving body detector 15 instead of feeding it to the approximate image generator 14. The switcher 12 feeds the second photographic image I2 to the approximate image generator 14 instead of feeding it to the moving body detector 15.

Figure 8:
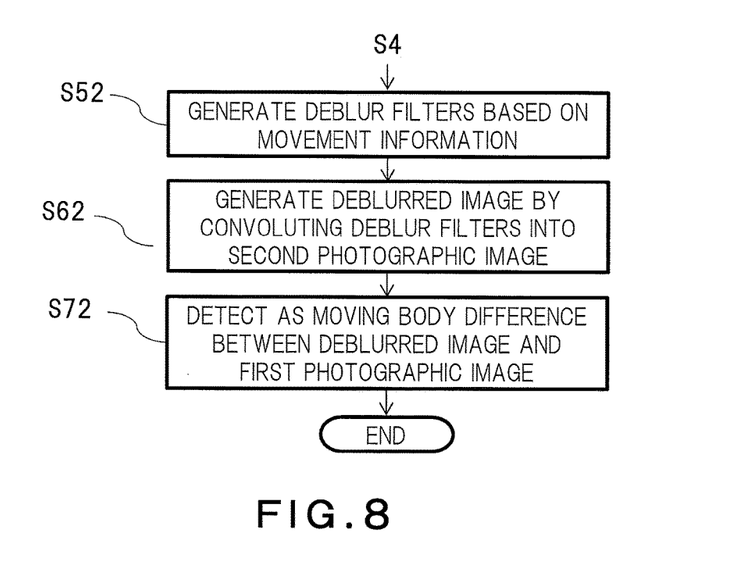
FIG. 8 is a flowchart describing an example of actions of the image processing system shown in FIG. 7.

FIG. 8 is a flowchart describing an example of actions of the image processing system 1 of the second embodiment.

The motion information acquirer 13 generates deblur filters on the basis of motion information (S52) instead of producing blur filters (S5 in FIG. 2). The deblur filters are filters capable of converting the second photographic image I2 into a deblurred image, and are an example of parameters.

What is referred to as the deblurred image is an image having a blur, which is derived from a movement of the imaging device 11, suppressed (corrected). Suppression may encompass removal.

The approximate image generator 14 generates a deblurred image (approximate image) (S62) instead of producing a blurry image (S6 in FIG. 2). The deblurred image is obtained by convoluting deblur filters into the second photographic image I2. An approximate image in the second embodiment is the deblurred image having a blur, which is contained in the second photographic image I2, suppressed based on motion information. The approximate image generator 14 performs image processing on the second photographic image I2 on the basis of the motion information so as to generate the deblurred image.

The moving body detector 15 detects as a moving body the difference between the deblurred image and the first photographic image I1 (S72) instead of detecting as the moving body the difference between the blurry image and the second photographic image I2 (S7 in FIG. 2).

The deblur filters are produced based on motion information. The deblur filters take account of a blur derived from a movement of the imaging device 11 but does not take account of a movement of a subject. Therefore, a deblurred image produced by convoluting the deblur filters has the blur, which is derived from the movement of the imaging device 11, suppressed (deblurred) but does not have the blur, which is derived from the movement of the subject, suppressed. Therefore, by obtaining the difference between the deblurred image and the first photographic image I1, a portion having the blur, which is derived from the movement of the imaging device 11, suppressed is removed from the deblurred image. In contrast, the blur derived from the movement of the subject is contained in the difference between the deblurred image and the first photographic image I1. The difference image represents the subject that has moved, that is, a moving body. Therefore, by obtaining the difference between the deblurred image and the first photographic image I1, the moving body can be readily and highly precisely detected. Namely, according to the second embodiment, precision in detecting a moving body can be upgraded using a simple technique.

As mentioned above, in the second embodiment, deblur filters are applied to the second photographic image I2 produced with a long exposure time in order to generate a deblurred image. The deblurred image is an image devoid of a blur that is derived from a movement of the imaging device 11 and that is contained in the second photographic image I2, but contains a blur derived from a movement of a moving body. By obtaining the difference between the deblurred image and the first photographic image I1 produced with a short exposure time, the blur derived from the movement of the moving body can be extracted. Accordingly, the moving body appearing in the first photographic image I1 and the second photographic image I2 can be detected.

(Third Embodiment)

Figure 9:
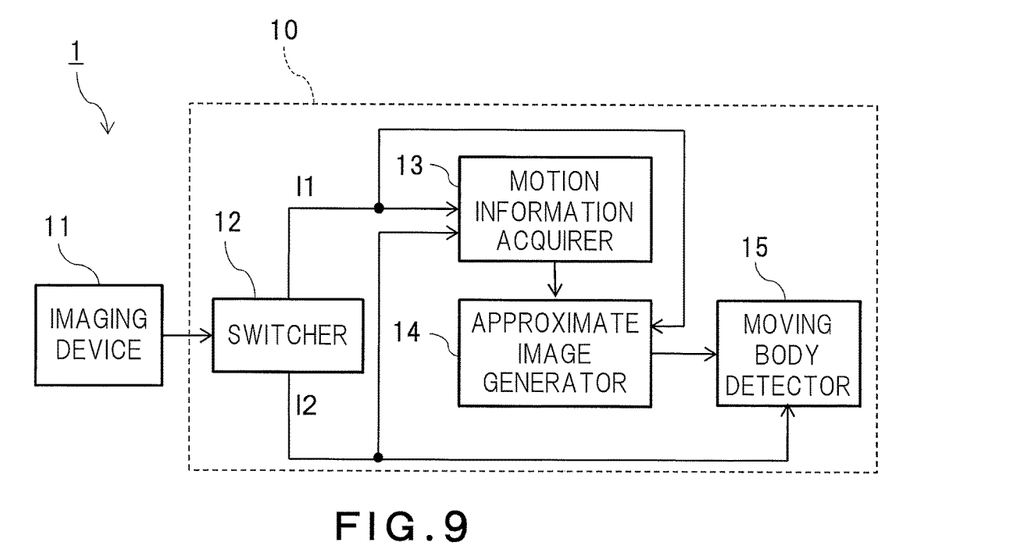
FIG. 9 is a block diagram of an image processing system in accordance with a third embodiment.

An image processing system 1 of a third embodiment is different from that of the first embodiment in a point that blur filters are updated. FIG. 9 is a block diagram of the image processing system 1 in accordance with the third embodiment. The same reference signs will be assigned to components corresponding to those of the first embodiment, and an iterative description will be omitted.

Figure 10:
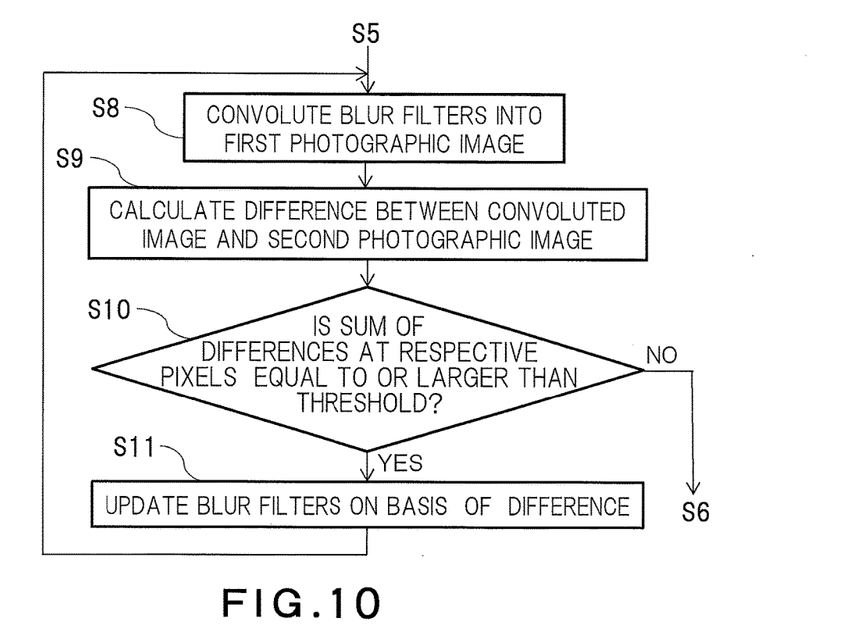
FIG. 10 is a flowchart describing an example of actions of the image processing system shown in FIG. 9.

The switcher 12 in the third embodiment feeds the second photographic image I2 not only to the moving body detector 15 but also to the motion information acquirer 13. FIG. 10 is a flowchart describing an example of actions of the image processing system 1 shown in FIG. 9. The motion information acquirer 13 generates blur filters (S5), and thereafter convolutes the blur filters into the first photographic image I1 (S8). Thereafter, the motion information acquirer 13 calculates the difference between the convoluted image and the second photographic image I2 (S9). Thereafter, the motion information acquirer 13 decides whether or not the sum of differences at respective pixels is equal to or larger than a threshold (S10).

If the sum of differences at respective pixels falls below the threshold (S10: No), the blur filters are sustained and a transition is made to acquisition (S6) of a blurry image. In contrast, if the sum of differences at respective pixels is equal to or larger than the threshold (S10: Yes), the motion information acquirer 13 updates (regenerates) the blur filters on the basis of the differences. If the difference is very large, there is a possibility that the difference may contain not only a moving body but a noise. As a cause of the noise, presumably, the blur filters cannot accurately simulate a blur derived from a movement of the imaging device 11. At S11, the blur filters are therefore updated. At S11, for example, the motion information acquirer 13 may modify the parameters of the blur filters only by a predefined change quantity. Thereafter, the motion information acquirer 13 repeats processing of convolution (S8) and subsequent steps for the updated blur filters.

Convolution of blur filters (S8) may be performed by the approximate image generator 14. A convoluted image may be referred to as a blurry image. Therefore, the difference between an image calculated at S9 and the second photographic image I2 may be referred to as a moving body. Therefore, if the difference calculated at S9 is discriminated as the moving body (for example, S10: No), production of a blurry image (S6) and detection of the difference between the blurry image and the second photographic image I2 (S7) may be omitted. Decision of S10 may be performed by the moving body detector 15.

As mentioned above, in the third embodiment, accuracy of blur filters can be discriminated based on the difference between an image, which has the blur filters convoluted into the first photographic image I1, and the second photographic image I2. By updating the blur filters that allow the difference to be equal to or larger than a threshold, precision in detecting a moving body can be further upgraded.

(Fourth Embodiment)

Figure 11:
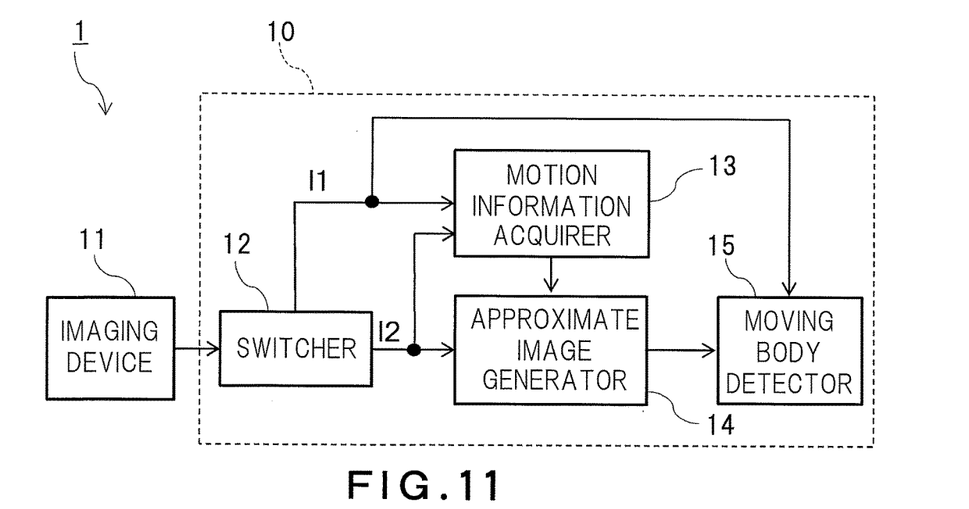
FIG. 11 is a block diagram of an image processing system in accordance with a fourth embodiment.

An image processing system 1 of a fourth embodiment is different from that of the second embodiment in a point that deblur filters are updated. FIG. 11 is a block diagram of the image processing system 1 in accordance with the fourth embodiment. The same reference signs will be assigned to components corresponding to those of the second embodiment, and an iterative description will be omitted. More particularly, the switcher 12 feeds the second photographic image I2 not only to the approximate image generator 14 but also to the motion information acquirer 13.

Figure 12:
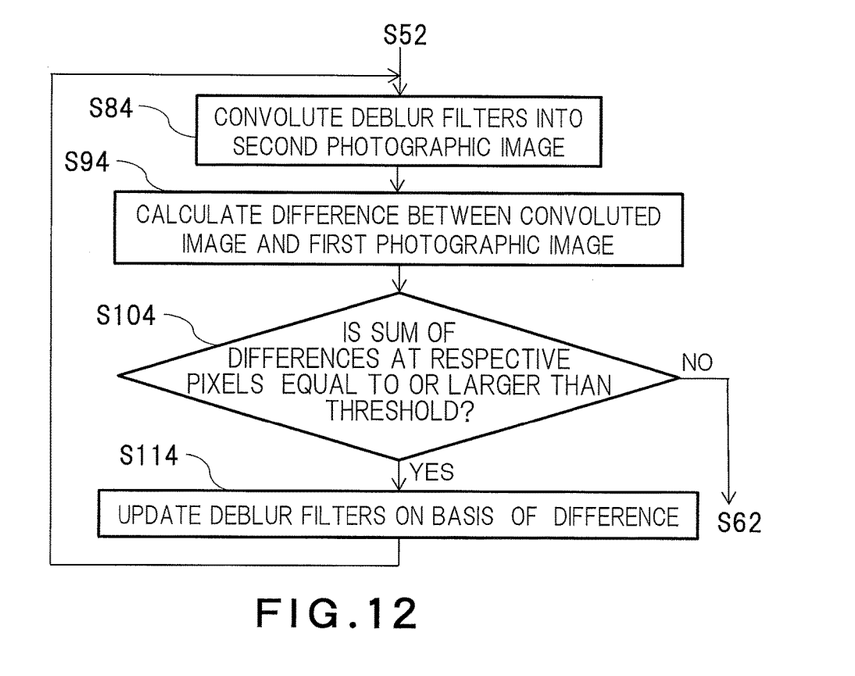
FIG. 12 is a flowchart describing an example of actions of the image processing system shown in FIG. 11.

FIG. 12 is a flowchart describing an example of actions of the image processing system 1 shown in FIG. 11. The motion information acquirer 13 generates deblur filters (S52), and thereafter convolutes the deblur filters into the second photographic image I2 (S84). Thereafter, the motion information acquirer 13 calculates the difference between the convoluted image and the first photographic image I1 (S94). Thereafter, the motion information acquirer 13 decides whether or not the sum of differences at respective pixels is equal to or larger than a threshold (S104). If the sum of differences at respective pixels is equal to or larger than the threshold (S104: Yes), the motion information acquirer 13 updates (regenerates) the deblur filters on the basis of the differences (S114). If the difference is very large, there is a possibility that the difference may contain not only a moving body but also a noise. As a cause of the noise, presumably, the deblur filters cannot accurately take account of a blur derived from a movement of the imaging device 11.

At S114, for example, the motion information acquirer 13 may update deblur filters by modifying parameters of the deblur filters only by a predefined certain change quantity. However, the present invention is not limited to this mode. Thereafter, the motion information acquirer 13 repeats processing of convolution (S84) and subsequent steps for the updated deblur filters. In contrast, if the sum of differences at respective pixels falls below the threshold (S104: No), the deblur filters are sustained and a transition is made to production (S62) of a deblurred image using the sustained deblur filters.

Convolution (S84) of deblur filters into the second photographic image I2 may be performed by the approximate image generator 14. An image convoluted at S84 may be referred to as a deblurred image. Therefore, the difference between the convoluted image and the first photographic image I1 may be referred to as a moving body. Therefore, if the difference calculated at S94 may be discriminated as the moving body (for example, S104: No), production of a deblurred image (S62) and detection (S72) of the difference between the deblurred image and the first photographic image I1 may be omitted. Decision at S104 may be performed by the moving body detector 15.

As mentioned above, in the fourth embodiment, accuracy of deblur filters can be discriminated based on the difference between an image, which has the deblur filters convoluted into the second photographic image I2, and the first photographic image I1. The deblur filters that are low in accuracy, that is, allow the difference to be equal to or larger than a threshold can be updated into deblur filters that are high in accuracy, that is, allow the differences to fall below the threshold. Accordingly, precision in detecting a moving body can be further upgraded.

(Fifth Embodiment)

Figure 13:
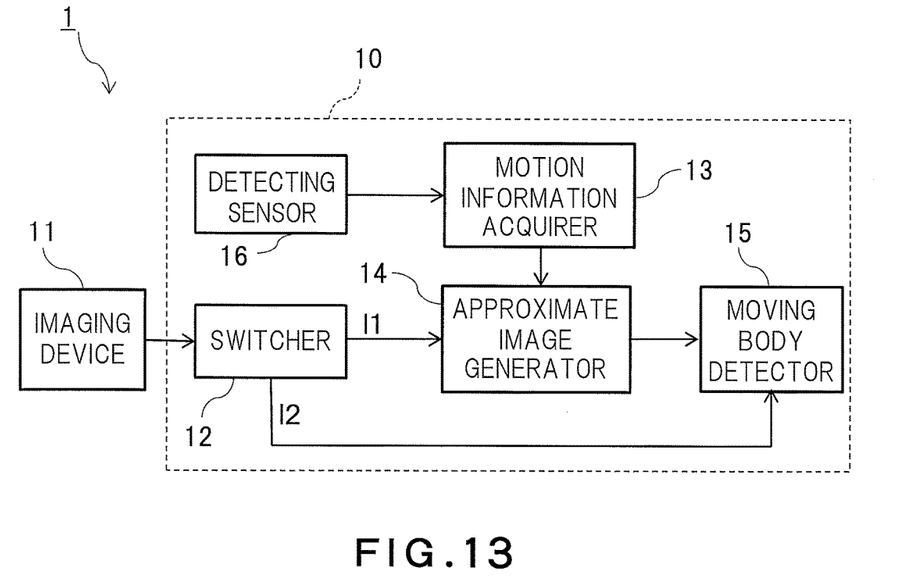
FIG. 13 is a block diagram showing an image processing system in accordance with a fifth embodiment.

An image processing system 1 of a fifth embodiment is different from that of the first embodiment in a component that acquires motion information. FIG. 13 is a block diagram of the image processing system 1 in accordance with the fifth embodiment. The same reference signs will be assigned to components corresponding to those of the first embodiment, and an iterative description will be omitted. More particularly, the moving body detecting device 10 includes a detecting sensor 16. The detecting sensor 16 detects motion information and outputs the detected motion information to the motion information acquirer 13. The detecting sensor 16 is, for example, a vehicle speed sensor (vehicle speed pulse generator), a gyro-sensor, or a steering angle sensor which is mounted in a vehicle.

Figure 14:
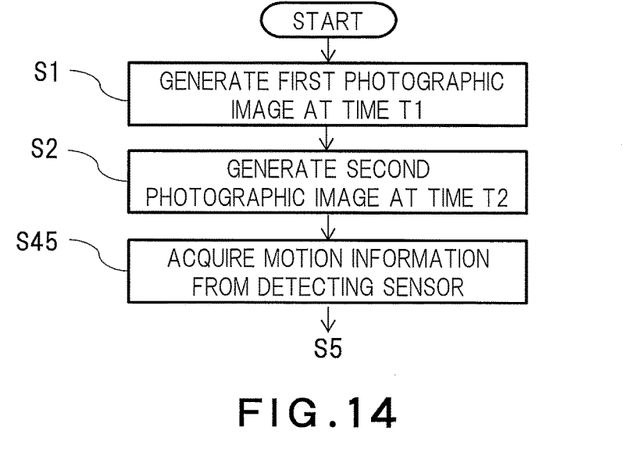
FIG. 14 is a flowchart describing an example of actions of the image processing system shown in FIG. 13.

FIG. 14 is a flowchart describing an example of actions of the image processing system 1 shown in FIG. 13. Namely, the motion information acquirer 13 acquires motion information from the detecting sensor 16 (S45) instead of acquiring the motion information on the basis of the first photographic image I1 (see S4 in FIG. 2). Even in the fifth embodiment, precision in detecting a moving body can be upgraded using a simple technique.

In the aforesaid embodiments, the second exposure time is a series of exposure times. However, the second exposure time in the embodiments is not limited to the series of exposure times. For example, the second exposure time may be a total exposure time obtained by adding up exposure times of at least two times of imaging out of exposure times of plural times of imaging within a predetermined period. In this case, the total exposure time may be a sum total of short exposure times like the first exposure time. In case the second exposure time is the total exposure time, the second photographic image may be a synthetic image obtained by synthesizing photographic images produced with respective exposure times.

The first to fifth embodiments may be appropriately combined. For example, in the second to fourth embodiments, the detecting sensor 16 may be used to acquire motion information. The embodiments do not exclude a case where the imaging device 11 in a stationary state is applied to detection of a moving body.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A moving body detecting device comprising a processing circuitry:
   the processing circuitry is configured to:
       acquire motion information on an imaging sensor capable of performing imaging with a first exposure time and a second exposure time longer than the first exposure time, the motion information comprising a posture of the imaging sensor;
       generate an approximate image generated by approximating one of a first photographic image imaged with the first exposure time and a second photographic image imaged with the second exposure time to another photographic image, on the basis of the motion information;
       generate a blurry image by performing image processing on the first photographic image on the basis of the motion information; and
       detect a moving body captured in the first and second photographic images, on the basis of the approximate image and the another photographic image, wherein the moving body is detected as a difference between the blurry image and the second photographic image.

2. The moving body detecting device according to claim 1, wherein the processing circuitry acquires the motion information on the basis of a plurality of first photographic images generated at different imaging times.

3. The moving body detecting device according to claim 1, wherein:
   the processing circuitry generates a new blurry image when the difference is equal to or larger than a threshold and detects the difference between the new blurry image and the second photographic image, as the moving body.

4. The moving body detecting device according to claim 1, wherein the processing circuitry acquires the motion information from a detecting sensor that detects the motion information.

5. The moving body detecting device according to claim 1, wherein the motion information contains a moving quantity and moving direction of the imaging sensor.

6. The moving body detecting device according to claim 1, wherein:
the processing circuitry generates a deblurred image by performing image processing on the second photographic image on the basis of the motion information and detects as the moving body a difference between the deblurred image and the first photographic image.

7. The moving body detecting device according to claim 6, wherein:
the processing circuitry generates a new deblurred image when the difference is equal to or larger than a threshold, and detects the difference between the new deblurred image and the first photographic image, as the moving body.

8. The moving body detecting device according to claim 1, further comprising a switcher that feeds the another photographic image to the processing circuitry, and feeds one of the photographic images to the processing circuitry.

9. The moving body detecting device according to claim 8, wherein the switcher performs a switching action synchronously with an exposure time with which the imaging sensor performs imaging.

10. An image processing system comprising:
an imaging sensor capable of performing imaging with a first exposure time and a second exposure time longer than the first exposure time;
a processing circuitry that is configured to:
generate an approximate image generated by approximating one of a first photographic image imaged with the first exposure time and a second photographic image imaged with the second exposure time to another photographic image, on the basis of a motion information on the imaging sensor, the motion information comprising a posture of the imaging sensor,
generate a blurry image by performing image processing on the first photographic image on the basis of the motion information, and
detect a moving body captured in the first and second photographic images, on the basis of the approximate image and the other photographic image, wherein the moving body is detected as a difference between the blurry image and the second photographic image.

11. The image processing system according to claim 10, wherein the processing circuitry acquires the motion information on the basis of a plurality of first photographic images produced at different imaging times.

12. The image processing system according to claim 10, wherein:
the processing circuitry generates a new blurry image when the difference is equal to or larger than a threshold and detects as the moving body the difference between the new blurry image and the second photographic image.

13. The image processing system according to claim 10, wherein the processing circuitry acquires the motion information from a detecting sensor that detects the motion information.

14. The image processing system according to claim 10, wherein the motion information contains a moving quantity and moving direction of the imaging sensor.

15. The image processing system according to claim 10, wherein:
the processing circuitry generates a deblurred image by performing image processing on the second photographic image on the basis of the motion information, and detects as the moving body the difference between the deblurred image and the first photographic image.

16. The image processing system according to claim 15, wherein:
the processing circuitry generates a new deblurred image when the difference is equal to or larger than a threshold and detects as the moving body the difference between the new deblurred image and the first photographic image.

* * * * *